United States Patent [19]

Otsuka et al.

[11] Patent Number: 5,541,634

[45] Date of Patent: Jul. 30, 1996

[54] COLOR PRINTER WITH SHIFTABLE LASER UNIT

[75] Inventors: Kenichiro Otsuka; Masatoshi Takano, both of Tokyo, Japan

[73] Assignee: Asahi Kogaku Kogyo Kabushiki Kaisha, Tokyo, Japan

[21] Appl. No.: 446,506

[22] Filed: May 22, 1995

[30] Foreign Application Priority Data

May 24, 1994 [JP] Japan .................................. 6-110037

[51] Int. Cl.⁶ ......................................... G03G 15/01
[52] U.S. Cl. ....................... 347/119; 347/232; 355/327
[58] Field of Search ................................... 347/115, 119, 347/232, 129, 256, 257; 355/326 R, 327, 228, 229, 133, 271, 274; 346/139 R, 139 D

[56] References Cited

U.S. PATENT DOCUMENTS

| | | | |
|---|---|---|---|
| 4,788,574 | 11/1988 | Matsumoto et al. | 355/326 R |
| 5,117,253 | 5/1992 | Suzuki | 355/32 |
| 5,351,115 | 9/1994 | Yamamoto et al. | 355/326 R |
| 5,374,980 | 12/1994 | Kubo et al. | 355/327 X |
| 5,442,428 | 8/1995 | Takahashi et al. | 355/271 |

*Primary Examiner*—Joan H. Pendegrass
*Assistant Examiner*—Sophia S. Chen
*Attorney, Agent, or Firm*—Greenblum & Bernstein P.L.C.

[57] ABSTRACT

A color printer includes a single laser scanning unit which is controlled to emit a scanning laser in accordance with color image data on each of a plurality of separated colors to be printed. A plurality of photosensitive drums, whose number corresponds to the number of colors to be printed, a laser scanning unit driver which moves the laser scanning unit to transfer positions corresponding to the photosensitive drums, and a plurality of developing units corresponding to the photosensitive drums are provided, to develop latent images drawn on the photosensitive drums by the laser emitted from the laser scanning unit, using a toner of each color. An endless transfer belt has a transfer surface which is successively moved to the transfer positions, and a transfer device which successively transfers the toner images developed by the developing units on the photosensitive drums, onto the same transfer surface of the transfer belt are also provided.

5 Claims, 2 Drawing Sheets

COLOR PRINTER WITH SHIFTABLE LASER UNIT

BACKGROUND OF THE INVENTION

1. Field of the Invention

The present invention relates to a color printer which prints a color image in accordance with color image data of each of separated colors.

2. Description of the Related Art

There is a need for realizing a full color recorder, such as a full color laser printer, for taking the place of conventional monochrome printers. In response, a color printer has been proposed, which includes a laser scanning unit, a photosensitive drum which receives a laser emitted from the laser scanning unit, and developing units having toner of different colors including yellow, cyan (blue), magenta, and black, etc.

In this color printer, the emission of the laser is controlled in accordance with color image data of separated colors. The laser is first emitted from a first laser scanning unit onto a photosensitive drum in accordance with color image data of a first color to form an electrostatic latent image for the first color. After the latent image is developed by the first developing unit, a charged or electrified recording paper is brought into contact with the photosensitive drum, so that a toner image for the first color is transferred to the recording paper. Thereafter, the above-mentioned operation including the formation of the electrostatic latent images for the remaining colors onto the same photosensitive drum, the development, and the transfer onto the same recording paper are repeated. Thereafter, when the toner images transferred onto the recording paper are fixed by a heat roller, etc., a fixed color image can be formed.

However, in a conventional color printer, a long time is required for printing, due to a presence of a plurality of developing units whose number corresponds to the number of colors (color image data) for one photosensitive drum. Moreover, the selective connection of the developing units driving system thereof causes an undesirable oscillation or irregular rotation of the photosensitive drum, etc., thus resulting in a deterioration of the image quality.

There is also known a color printer which includes the same number of photosensitive drums and developing units corresponding to the number of the colors (color image data), and laser scanning units whose number corresponds to the number of photosensitive drums. In this printer, since toner images of different colors are formed on the respective photosensitive drums, the printing time can be reduced. Nevertheless, the printer is large, complicated and expensive.

SUMMARY OF THE INVENTION

The primary object of the present invention is to provide a simple and compact color printer in which no oscillation or irregular rotation of the photosensitive drum, etc., occurs, and hence a high quality image is ensured.

To achieve the object mentioned above, according to the present invention, There is provided a color printer including a single laser scanning unit which is controlled to emit a scanning laser in accordance with color image data on each of the separated colors to print; a plurality of photosensitive drums whose number corresponds to the number of colors to print; a mechanism for moving the laser scanning unit to transfer positions corresponding to a plurality of photosensitive drums; a plurality of developing units corresponding to the photosensitive drums, to develop latent images drawn on the photosensitive drums by the laser emitted from the laser scanning unit, using a toner of each color; an endless transfer belt having a transfer surface which is successively moved to the transfer positions; and, a transfer mechanism includes for successively transferring the toner images developed by the developing units on the photosensitive drums, onto the same transfer surface of the transfer belt.

Preferably, the transfer means mechanism includes a transfer roller located on the opposite side of the photosensitive drums with respect to the endless transfer belt. The transfer roller can be made of a single roller which is successively moved to the transfer positions corresponding to the photosensitive drums in synchronization with the rotation of the endless transfer belt.

Preferably, the transfer mechanism includes the same number of rollers as the number of the photosensitive drums. Provision is made for a transfer charger for transferring toner images formed on the same transfer surface of the endless transfer belt onto a recording paper.

According to another aspect of the present invention, there is provided a color printer including a plurality of photosensitive drums and developing units corresponding to a plurality of separated colors to print; a laser scanning unit common to the photosensitive drums and the developing units, the laser scanning unit being adapted to emit a laser in accordance with color image data on each of the separated colors; and, a transfer mechanism for transferring images formed on the photosensitive drums by the common laser scanning unit and developed by the corresponding developing units onto the same recording paper in a registered state.

The present disclosure relates to subject matter contained in Japanese Patent Application No. 06-110037 (filed on May 24, 1994) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
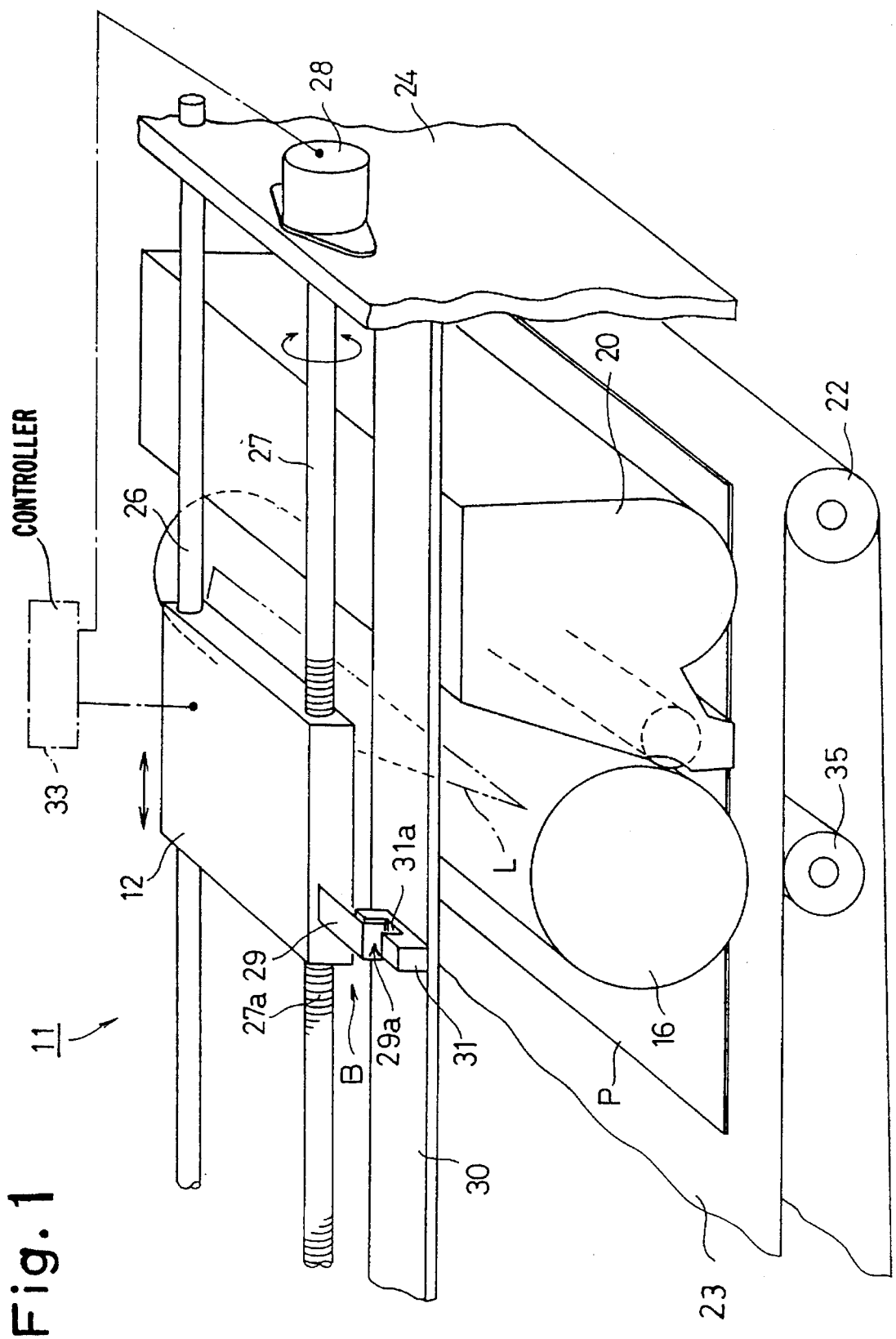
FIG. 1 is a perspective view of a color printer according to the present invention; and, FIG. 2 is a schematic side view of the color printer shown in FIG. 1.
Figure 2:
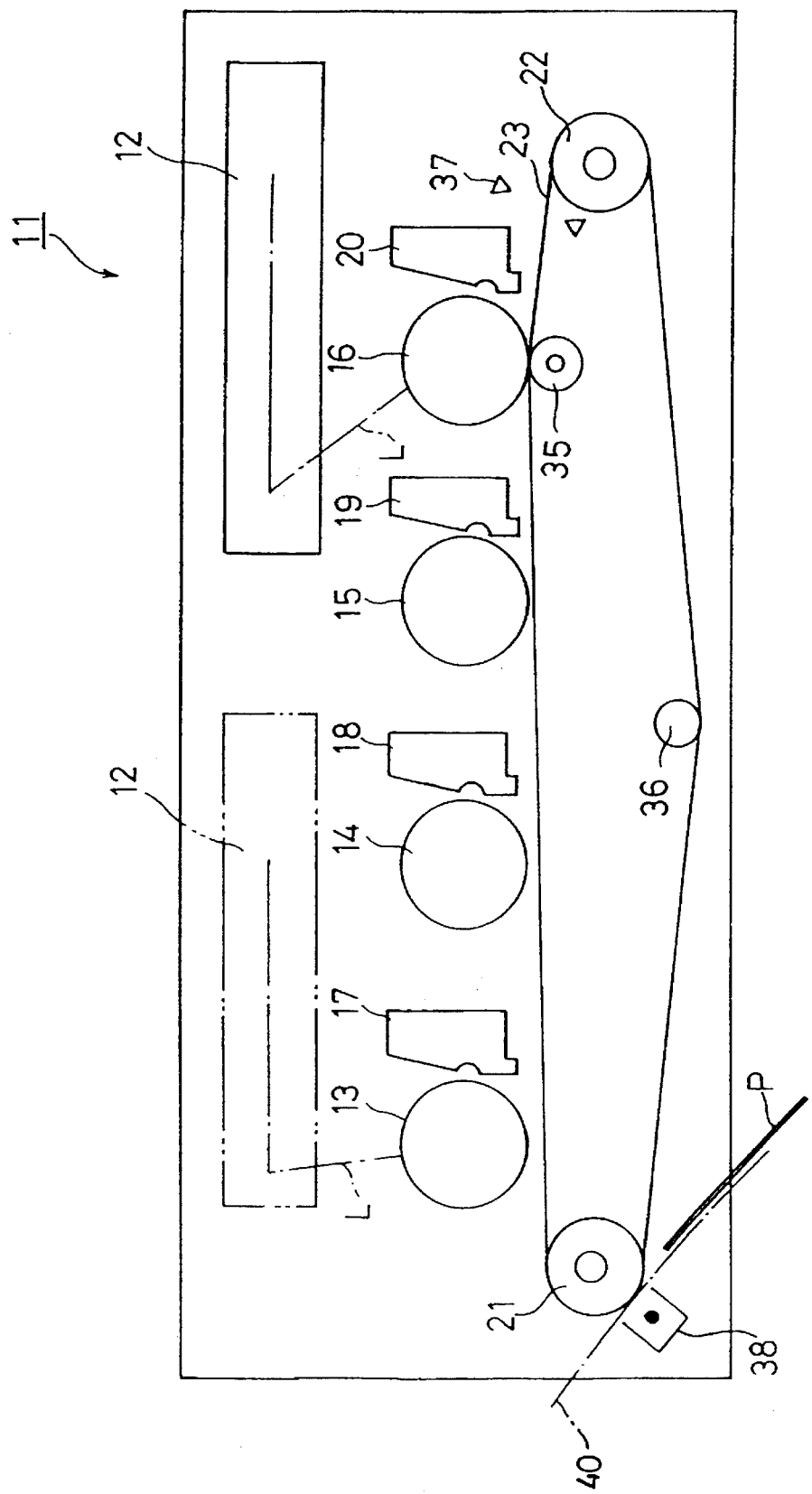

As shown in FIGS. 1 and 2, a color printer 11 includes a single laser scanning unit (LSU) 12, a plurality of photosensitive drums 13, 14, 15 and 16, and a plurality of developing units 17, 18, 19 and 20. The LSU 12 is controlled to emit a laser in accordance with color image data of each of separated colors. The number of the photosensitive drums 13 through 16 corresponds to the number of colors (color image data). The developing units 17, 18, 19 or 20 develop electrostatic latent images of the respective colors formed on the corresponding photosensitive drums 13 through 16 by the laser beams emitted from the LSU 12, using different color toners (yellow, cyan, magenta, black).

The color printer 11 is provided with a transferring endless belt 23 which is wound about a pair of rollers 21 and 22. The transfer surface of the transferring belt 23 lies in a plane extending along the photosensitive drums 13 through 16. A transfer roller 35 which constitutes a transfer mechanism is provided on the opposite side of the transfer surface of the transferring belt 23 with respect to the photosensitive drums 13 through 16. The transfer roller 35 is driven by a driving mechanism (not shown) which is in turn controlled by a controller 33 (shown in FIG. 1) to successively move to transfer positions corresponding to stop positions of the LSU 12) in which the transfer roller 35 is opposed to the photosensitive drum 13, 14, 15 or 16 through the endless belt 23 in synchronization with the rotation of the endless belt 23. In each transfer position, the transfer roller 35 is moved up to press the endless belt 23 against the associated photosensitive drum. The transfer roller 35 transfers a toner image of each color developed by the corresponding developing unit 17, 18, 19 or 20 onto the respective corresponding photosensitive drum provided for each color.

It is possible to provide a plurality (e.g. four) of transfer rollers 35 corresponding to the photosensitive drums 13 through 16. In this alternative, the transfer rollers 35 are constructed such that they are moved up at a predetermined timing to press the transfer surface of the endless belt 23 against the photosensitive drums when the same transfer surface reaches the transfer positions corresponding to the photosensitive drums.

The photosensitive drums 13 through 16 are normally slightly spaced from the transfer belt 23, so that there is a space between the transfer belt 23 and the photosensitive drums 13 through 16. Thus, the transfer belt 23 is elevated by the transfer roller 35 only when the latter is located directly below the transfer belt at the transfer positions, so that the transfer roller 35 is brought into contact with the corresponding photosensitive drum through the transfer belt 23. There is an idle roller 36 within the endless belt 23 to apply tension on the latter from the inside in the outward direction (bottom direction in FIG. 2). The idle roller 36 is movable to adjust the position thereof in the vertical direction in FIG. 2 for adjusting the change in the length of the endless belt 23, caused by the lateral movement of the transfer roller 35. Thus, the tension of the endless belt 23 is constant.

There is a sensor 37 which detects a transfer start position at which the transfer of the first color (e.g. black) for the transfer belt 23 begins, in front of the developing unit 20. The detection signal detected by the detector (sensor) 37 is sent to the controller 33 which controls the printing timing to prevent the printing position for the subsequent colors from deviating.

The color printer 11 also includes two parallel guide bars 26 and 27 which extend between a pair of right and left body chassis 24 (only one of which is shown in the drawings). The LSU 12 is slidably attached to the guide bars 26 and 27 along the length thereof. The guide bar 27 is provided with a threaded portion (male screw threads) 27a which constitutes a ball-screw mechanism B together with a large number of ball bearings (not shown) provided within the LSU 12. The LSU 12 is linearly moved along the guide bars 26 and 27 when a drive motor 28 is driven to rotate the guide bar 27 in the forward or reverse direction.

Another body chassis 30 which extends in parallel with the guide bar 27 is provided between the right and left body chassis 24. The body chassis 30 is provided with position sensor 31 corresponding to the photosensitive drums 13 through 16 to detect a detecting plate 29 provided on the LSU 12. The position sensor 31 is made of, for example, a photo-interrupter having an opposed light receiver and light emitter, located on opposite sides of a recess 31a of the position sensor 31, so that when a projection 29a of the detecting plate 29 passes through the recess 31a, it is detected that the LSU 12 has reached a transfer position corresponding to any of the photosensitive drums 13, 14, 15, or 16. The detection signal is supplied to the controller 33.

The controller 33 moves the LSU 12 to the transfer positions corresponding to the photosensitive drums and stops the LSU 12 at the transfer positions, in accordance with the detection signal. Thus, a laser light source (not shown) is activated to selectively emit the laser at the transfer positions in accordance with the color image data of the separated colors onto the associated photosensitive drum. The controller 33 rotates the drive motor 28 when a toner image of one color corresponding to one of the photosensitive drums is transferred onto the transfer surface of the transfer belt 23 to move the transfer surface to an adjacent transfer position corresponding to a subsequent photosensitive drum. These operations are repeated until the transfer of the toner images of the four colors is completed.

The controller 33, the drive motor 28, and the ball-screw mechanism B constitute a laser scanning unit driving mechanism which moves the LSU 12 to the positions corresponding to the photosensitive drums 13, 14, 15, and 16 to thereby emit the laser onto each photosensitive drum in accordance with the color image data.

In FIG. 2, a paper feeding member 40 and a transfer charger 38 which is opposed to the roller 21, so that the paper feeding member 40 is located between the roller 21 and the transfer charger 38 are provided. The transfer charger 38 charges the recording paper P which is fed when the same transfer surface of the transfer belt 23 on which the different toner images of four colors have been transferred reaches the vicinity of the paper feeding member 40.

The color printer 11 as constructed above operates as follows.

When the main power switch (not shown) of the printer is turned ON, the controller 33 detects the position of the LSU 12. If the LSU 12 is not positioned at an initial position (transfer position) in which the LSU 12 is opposed to the photosensitive drum 16, the drive motor 28 is driven to move the LSU 12 to the initial position. At the same time, the controller 33 supplies a control signal to the drive mechanism (not shown) to move the transfer roller 35 to the position corresponding to the LSU 12.

The controller 33 controls the emission of the laser in accordance with color image data of the first color, i.e., black, when the LSU 12 is located at the initial position. Consequently, the laser is emitted onto the photosensitive drum 16 which rotates while being charged by corona discharge, so that an electrostatic latent image to which a black toner is to be applied is formed on the photosensitive drum 16. The photosensitive drum 16 is then developed by the charged black toner through the developing unit 20. Namely, a toner image is formed. Thereafter, the transfer roller 35 is moved up to press the transfer belt 23 against the photosensitive drum 16, and then, the electric charges are discharged onto the transfer surface of the transfer belt from the back surface thereof. Consequently, the transfer belt is charged with more intensive electric charges than the charged photosensitive drum 16. As a result, the toner image on the photosensitive drum 16 is transferred onto the transfer surface of the transfer belt 23.

The controller 33 rotates the drive motor 28 to the second transfer position in which the LSU 12 is opposed to the photosensitive drum 15 when the transfer of the black toner image onto the transfer surface of the transfer belt 23 is completed. At the same time, the transfer roller 35 is moved to the position corresponding to the LSU 12 located at the second transfer position. In the second transfer position, the above-mentioned operation is repeated to transfer a magenta toner image onto the same transfer surface of the transfer belt 23 on which the black toner image has been transferred by the previous transfer operation. The controller 33 moves the LSU 12 to a third transfer position in which the LSU 12 is opposed to the photosensitive drum 14 when the transfer of the magenta toner image onto the transfer belt 23 is completed. At the same time, the transfer roller 35 is moved to the position corresponding to the LSU 12 located in the third transfer position. Thereafter, the operation similar to those previously mentioned is carried out to transfer a cyan toner image onto the same transfer surface of the transfer belt 23 on which the black and magenta toner images have been transferred.

Thereafter, the controller 33 moves the LSU 12 to a fourth transfer position in which the LSU 12 is opposed to the photosensitive drum 13 when the transfer of the cyan toner image onto the transfer belt 23 is completed. At the same time, the transfer roller 35 is moved to the position corresponding to the LSU 12 located in the fourth transfer position. Thereafter, the operation similar to that previously mentioned is carried out to transfer a yellow toner image onto the same transfer surface of the transfer belt 23 on which the black, magenta and cyan toner images have been transferred.

Eventually, the toner images of four colors (yellow, cyan, magenta and black), thus transferred onto the same transfer surface of the transfer belt 23 are all transferred onto the recording paper P which has been charged by the transfer charger 38 in the vicinity of the paper feed member 40. Thus, a full color picture is formed on the recording paper P. Furthermore, the recording paper P having a full color picture formed thereon is subject to the fixing operation by a thermal device such as a heater or a heat roller etc. Thereafter, the controller 33 returns the LSU 12 and the transfer roller 35 to the initial position corresponding to the photosensitive drum 16.

As can be seen from the above discussion, according to the present invention, since only one LSU 12 is necessary to emit the laser in accordance with color image data on each of the separated colors, the manufacturing cost of the printer can be reduced in comparison with conventional color printers in which a plurality of expensive LSUs 12 corresponding to the number of colors (color image data) are provided. Moreover, the structure of the color printer can be simplified and miniaturized. In addition to the foregoing, according to the present invention, since the number of photosensitive drums and developing units are the same as the number of the colors (color image data) for printing, no selection of the connection thereof to the driving system is necessary, and hence, no oscillation or irregular rotation of the photosensitive drums occurs, thus resulting in a high quality image.

It should be noted that the transfer charger 38 can be formed by a transfer roller. In this case, it is necessary to provide a drive and control mechanism to move the transfer roller (transfer charger) to selectively come into contact with the endless transfer belt 23.

What is claimed:

1. A color printer comprising:

a single laser scanning unit which is controlled to emit a scanning laser in accordance with color image data for each of a plurality of separated colors to be printed;

a plurality of photosensitive drums whose number corresponds to a number of said plurality of separated colors to be printed;

means for moving said laser scanning unit to transfer positions corresponding to said plurality of said photosensitive drums;

a plurality of developing units corresponding to said photosensitive drums, to develop latent images drawn on said photosensitive drums by said laser emitted from said laser scanning unit, using a toner of each of said plurality of separated colors;

an endless transfer belt having a transfer surface which is successively moved to said transfer positions; and, transfer means for successively transferring the toner images developed by the developing units on said photosensitive drums, onto said same transfer surface of said transfer belt.

2. A color printer according to claim 1, wherein said transfer means comprises a transfer roller located on an opposite side of said endless transfer belt with respect to said photosensitive drums.

3. A color printer according to claim 2, wherein said transfer roller is made of a single roller which is successively moved to said transfer positions corresponding to said photosensitive drums in synchronization with a rotation of said endless transfer belt.

4. A color printer according to claim 1, wherein said transfer means comprises a same number of rollers as a number of the photosensitive drums.

5. A color printer according to claim 1, further comprising a transfer charger for transferring toner images formed on said same transfer surface of said endless transfer belt onto a recording paper.

* * * * *